(12) United States Patent
Liu

(10) Patent No.: US 7,483,854 B2
(45) Date of Patent: Jan. 27, 2009

(54) METHOD AND SYSTEM FOR INTELLIGENT AUTOMATED SECURITY TRADING VIA THE INTERNET

(76) Inventor: Michael C. Liu, No. 282, Hsiang Yang Rd., Feng Yuan City, Taichung Hsien (TW)

( * ) Notice: Subject to any disclaimer, the term of this patent is extended or adjusted under 35 U.S.C. 154(b) by 797 days.

(21) Appl. No.: 10/351,240

(22) Filed: Jan. 24, 2003

(65) Prior Publication Data

US 2004/0148242 A1 Jul. 29, 2004

(51) Int. Cl.
*G06Q 40/00* (2006.01)
(52) U.S. Cl. .......................... 705/37; 705/35; 705/36 R
(58) Field of Classification Search .................... 705/35, 705/36 R, 37
See application file for complete search history.

(56) References Cited

U.S. PATENT DOCUMENTS

2003/0065598 A1* 4/2003 Bunda .......................... 705/36
2003/0078865 A1* 4/2003 Lee .............................. 705/35

OTHER PUBLICATIONS

Ceron, Gaston. "The Best Way To Trade Stocks—Wireless Gadgets and Direct-access Trading are Changing the Way Investors Play the Market". Wall Street Journal. (Eastern edition). New York, N.Y.: Nov. 27, 2000, p. R.6.*

M2 Presswire. "Inprise/Borland: Inprise/Borland helps bring wireless trading to Dutch exchanges; Leading Dutch options trading company selects Inprise/Borland's VisiBroker to enable real-time trading transactions." Coventry: Jun. 8, 2000. p. 1.*
M2 Presswire. "Staffware eProcess to deliver mobile business applications on Nokia's WAP platform." Coventry: Jun. 5, 2000. p. 1.*

* cited by examiner

*Primary Examiner*—Lalita M Hamilton
(74) *Attorney, Agent, or Firm*—William E. Pelton, Esq.; Cooper & Dunham LLP

(57) ABSTRACT

A method and system for intelligent automated security trading via the Internet, which provides an Automated Trading Service Center (ATSC), offering a Home Page Service and managing at least one Virtual Fund Manager (VFM) syst. The ATSC is a wireless e-commerce service center providing automated trading services to investors anytime anywhere. By accessing the HPS, the investor can interact with ATSC to develop a custom investment strategy based personal VFM system to automatically trade electronic trading based securities. The VFM is a real time running program incorporated by four engines: the Quote Processing Engine, the Decision Making Engine, the Order Execution Engine, and the Order Processing Engine. Under commands of ATSC server, the VFM can periodically retrieve quotation from the security exchange, monitor the market fluctuation by performing intensive calculations to detect the desired Buy/Sell timing as predetermined by investor's proprietary investment strategy algorithms, and ultimately execute the transaction automatically.

4 Claims, 6 Drawing Sheets

METHOD AND SYSTEM FOR INTELLIGENT AUTOMATED SECURITY TRADING VIA THE INTERNET

BACKGROUND OF THE INVENTION

1. Field of the Invention

The present invention relates to a method and system for intelligent automated security trading via the wireless Internet by executing investor's custom developed investment strategy algorithms. More particularly, the present invention provides an electronic commerce automated trading service center to empower investors to remotely control their personal Virtual Fund Manager systems to pursue the automated security trading in real time.

2. Description of Related Art

Trading securities, such as stocks, futures, options, bonds, and foreign currencies, has been always a time consuming process for investors. It takes long time to perform non-stop monitoring of the market fluctuation. Also, at the time the desired Buy/Sell point is occurring, the investor must make immediate decision to execute the order. Therefore, a busy investor rarely has the opportunity to personally handle securities during trading hours. A lot of high pay incomers are reluctant to invest in stock market simply because of this reason. Even professional traders who may dedicate to handle security trading in full time, there are still obvious constraint for them to handle huge amount of securities concurrently due to the limitation of manual manipulation capabilities. Besides, there are situations where investors may miss profit taking opportunity when taking a vacation, or make opposite decision at critical moment due to psychological effect.

Thus, an intelligent automated trading system that can restlessly execute investors' desired investment strategy anytime anywhere is needed to relieve the tremendous working load of timing critical security trading, just like how robot is needed to replace human's routine works. To build an effective automated trading system, a well established technology infrastructure is needed, including real time electronic security exchange service, on-line security brokers, wireless broadband Internet, and powerful computers for real time data processing and computation.

It has been many years since on-line trading was available for investors to trade securities via the Internet. Initially, it means that an investor can send message of his investment decisions via e-mail to his security broker for further processing. Later, the on-line broker provided user friendly system for investors to retrieve quote and place orders by clicking menu driven interface. However, the capability of electronic security exchange service has been a bottleneck to build an effective automated trading system running in real time. One typical problem for electronic security exchange service is how to quote the price instantly, including bid, ask, and trading price, in a correct sequence, at a correct timing, based on the trading report issued by various sources located at numerous locations. If the discrepancy of the quotation provided by a security exchange is too big relative to what is actually happening in real time, all the subsequent automated monitoring, calculation, decision and execution effort would become meaningless. Especially, for active day traders, few seconds of delay, or incorrect sequenced quote could mean a substantial damage to the trading results.

Any previous attempt to develop an automated trading system within the technological constraint of electronic security exchange service must ignore the potential inaccuracy quoting within seconds, and thus can work at most on a slower motion type of decision making process. For example, it may adopt an investment strategy to buy a particular stock, and hold it for couple hours, or even days, until it appreciates 3% for ultimate liquidation automatically. This is not sophisticated enough to be characterized as a real time processing.

As NASDAQ upgrades to the highly transparent Super-Montage trading platform, where quotes and orders go through a single-computer architecture for true real time processing, it becomes feasible to develop an intelligent automated security trading system to benefit day traders in particular where intensive real time day trade capability is an essential requirement, and any other typical investors in general where timing critical judgment capability is always an essential element to enhance the profit. The same architecture of such intelligent automated stock trading system can also be adapted to any other electronic security exchange services who offer trading technologies comparable to NASDAQ SuperMontage level.

The present invention provides a method and system for intelligent automated security trading via the wireless Internet to perform real time execution to trade securities automatically at any electronic security exchange with real time centralized quoting capabilities similar to what NASDAQ SuperMontage is offering.

SUMMARY OF THE INVENTION

A main objective of the present invention provides a method and system for intelligent automated security trading via the Internet. The system implemented by the method offers a real time on-line automatic trading capability to substantially enhance the efficiency of transaction handling which is particularly suitable for professional day traders to concurrently process huge amount of trading transactions every day. The intelligent aspect of the present invention has further advantageous function to offer a smart trading capability which empowers investor to design his/her own desirable investment strategy. The networking aspect of the present invention has another advantageous function to utilize a wireless communications capability which empowers traders to remotely operate the system in anyplace at anytime.

Another objective of the present invention provides an electronic commerce business method to concurrently serve numerous investors by engineering, managing, and promoting the custom developed intelligent automated security trading system via the Internet, which serves as a powerful tool for investors to conduct risk management when investing in securities.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
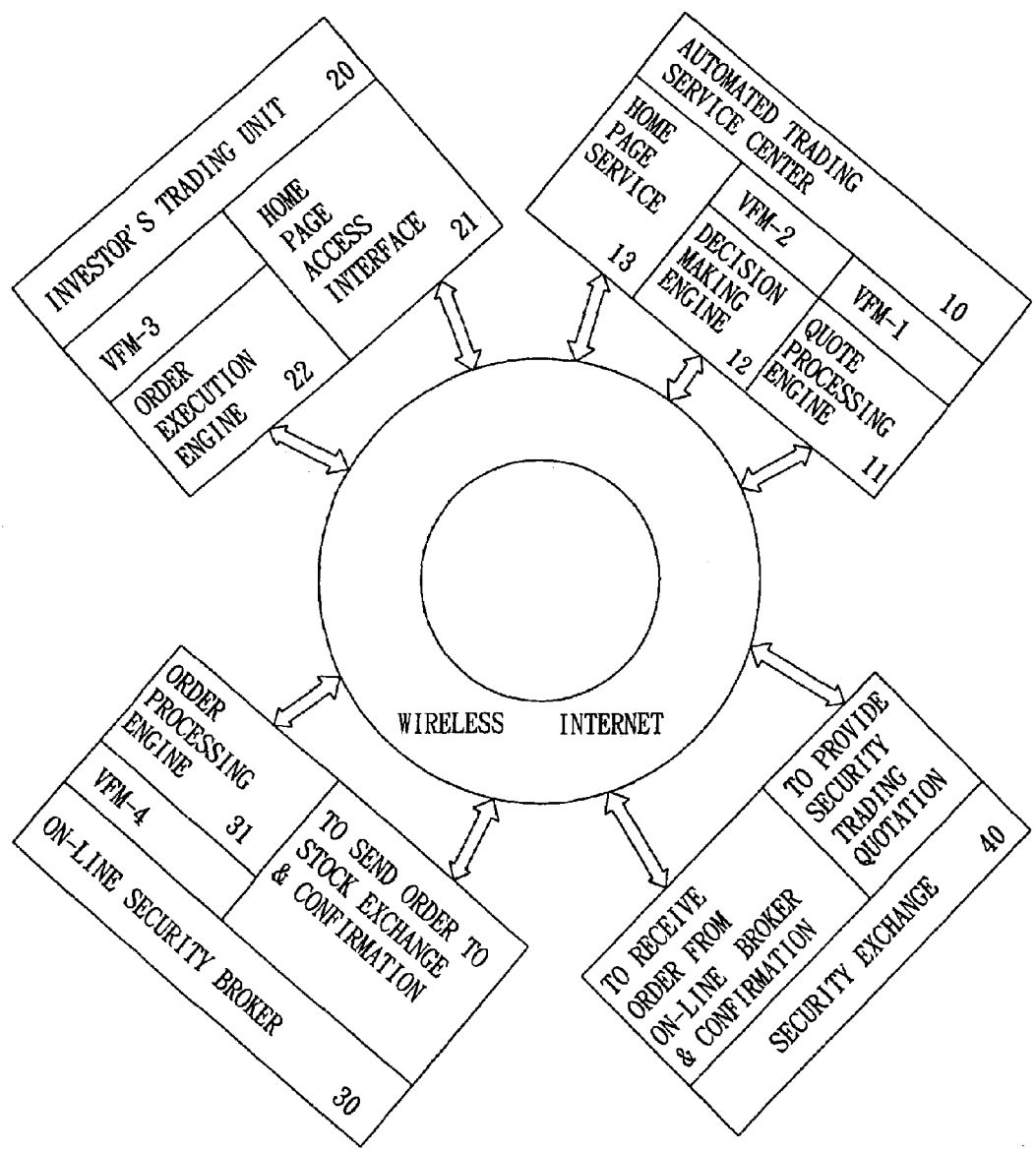
FIG. 1 is an architecture of all participating parties interacted via the wireless Internet based communications network to perform a method and system in accordance with the present invention.

With reference to FIG. 1, a method for intelligent automated security trading in accordance with the present invention includes three parts interacted via the wireless Internet: a web server system known as the Automated Trading Service Center (10) (ATSC), a client system located at an investor's trading unit (20) and an on-line security broker (30).

The ATSC (10) offers Home Page Service (13) (HPS) and builds a quote processing engine (11) and a decision making engine (12) links to the quote processing engine (11). The quote processing engine (11) links to at lest one security exchange (40) to obtain real time market information including fluctuation quotations and open/close trading times. The decision making engine (12) has multiple investor's investment strategy algorithms.

The investor's trading unit (20) is a desktop/mobile computing platform having a home page service access interface (21) and an order execution engine (22). The home page service access interface (21) links to the ATSC (10) via the wireless Internet.

The on-line security broker (30) has an order processing engine (31) links to investor's unit (20) via the wireless Internet. Therefore, a personal virtual fund manager (VFM) system is consisted of the quote processing engine, the decision making engine, the order execution engine and the order processing engine.

A personal virtual fund manager system (VFM-1, VFM-2, VFM-3, VFM-4) consists of the quote processing engine, the decision making engine, the order execution engine and the order processing engine.

The method has three parts after providing the ATSC (10) linking to the at lest one security exchange (40), investor's trading unit (20) and the on-line security broker (30).

(1) A first part of the method under control of the ATSC (10) offering the Home Page Service (HPS) (13) has steps of:

engineering at least one decision making engine (12) for each new investor by the HPS;

managing daily account activities for each active trader;

promoting automated trading service to prospective customers; and under control of an ATSC (10), executing at least one decision making engine (12) having further steps of:

retrieving market information including fluctuation quotations and market open/close trading times from the at least one security exchange (40) through the quote processing engine (11);

monitoring the market open/close trading times;

making investment decisions in accordance with each investor's own investment strategy algorithms in the corresponding decision making engine (12); and notifying an investor's trading unit (20) of an investment instruction whenever timing of placing an order is detected based on the investment decisions.

(2) A second part of the method under control of the investor's trading unit (20) performing subsequent functions of the order execution engine (22) has steps of:

receiving the investment instruction from the ATSC;

executing an order placing process built into the order execution engine (22), wherein an order is automatically sent; and setting an operation mode built into the order execution engine (22) to auto trading mode or semi-auto trading mode.

(3) A third part of the method under the control of the on-line security broker (30) performing subsequent functions of the order processing engine (31) has steps of:

receiving the order from the second part in the investor's trading unit (20);

finalizing transactions with the at least one security exchange (40) in accordance with the order.

Based on the forgoing description, the method provides a complete on-line automated security trading procedure to serve one or many investors to run their own personal Virtual Fund Manager systems at the same time.

Figure 2:
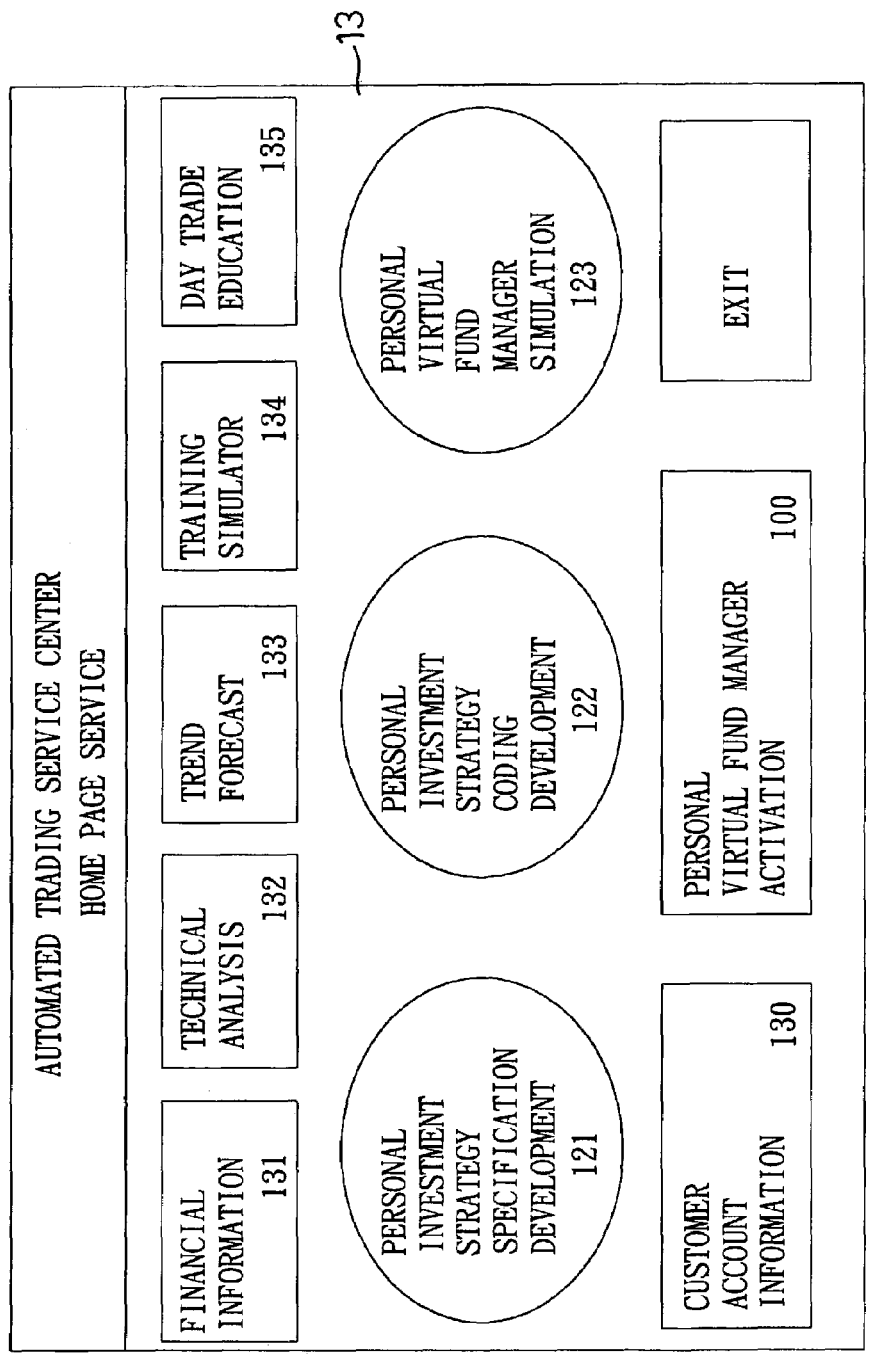
FIG. 2 is a block diagram of HOME PAGE SERVICE (HPS) offered by Automated Trading Service Center (ATSC) in accordance with the present invention.

With further reference to FIG. 2, the HPS (13) provides various electronic commerce services to all investors including engineering, management and promotion. The first portion of the electronic commerce services provides an engineering service and includes personal investment strategy specification development (121), personal investment strategy coding development (122) and personal virtual fund manager simulation (123) for each new investor. The second portion of the electronic commerce services provides daily account activities management for each active investor and includes customer account information (130) and personal virtual fund manager activation (100). The third portion of the electronic commerce services provide a promoting step and has financial Information (131), technical analysis service (132), trend forecast (133), training simulator (134) and day trade education (135).

With further reference to FIG. 1, the web server system of the ATSC (10), in addition to providing HPS (13), also keeps each personal virtual fund manager system (VFM-1, VFM-2, VFM-3, VFM-4) within its operational control for all active investors. The personal virtual fund manger system (VFM-1, VFM-2, VFM-3, VFM-4) is a real time running program integrated by four engines: the quote processing engine (11), the decision making engine (12), the order execution engine (22) and the order processing engine (31). The web server of the ATSC (10) controls both the quote processing engine (11) and the decision making engine (12) of the personal virtual fund manager system. The quote processing engine (11) connects and communicates with the electronic security exchange (40) to periodically retrieve and process real time market information including quotation fluctuations and the open/close trading times via the Internet.

Figure 3:
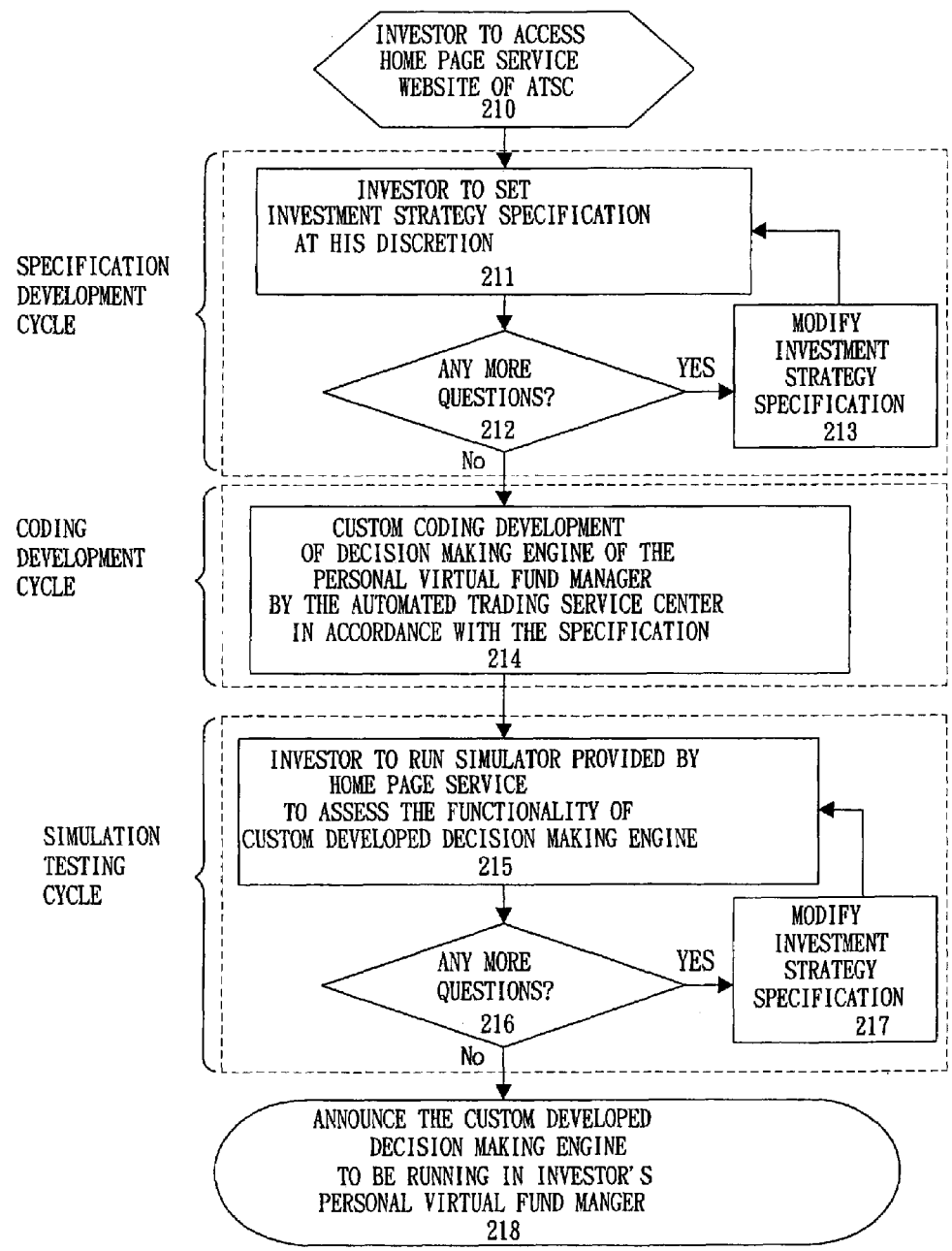
FIG. 3 is a flow chart showing a procedure that an investor interacts with the HOME PAGE SERVICE of ATSC to develop a custom investment strategy based Decision Making Engine which serves as the logic unit of the whole personal Virtual Fund Manager (VFM) system.

The decision making engine (12) further analyzes, calculates and determines buy/sell timing according to predetermined personal investment strategy algorithms based on the real time market information from the quote processing engine (11) and subsequently sends the order instructions to the order execution engine (22) of the investor's trading unit (20). As disclosed by the first part of the Method of the present invention, an each investor's desirable decision making engine (12) is custom built and used as a part of the personal virtual fund manager system via the engineering service provided by the first portion of the electronic commerce services of the HPS (13). With further reference to FIG. 3, an operational procedure of the HPS provides three processing cycles to perform an engineering service of custom developing the decision making engine described as follows:

(a) Specification Development Cycle, wherein an investor accesses the HPS via the wireless Internet to set the investment strategy specification at the his/her discretion;

(b) Coding Development Cycle, wherein the investment strategy specification is coded to form the Decision Making Engine (12) which executes the investor's proprietary investment strategy; and (c) Simulation Testing Cycle, wherein the investor can select the personal virtual fund manager simulation service (123) on the HPS (13) to simulate functionality of the decision making engine (12) with the quote processing engine (11).

With further reference to FIG. 1. The investor's trading unit (20) is implemented in accordance with the second part of the method as disclosed above. Therefore, the order execution engine (22) receives order instructions from the decision making engine (12) and automatically places orders including order instructions by interacting with the on-line security broker (30) under a fully automated execution mode.

The on-line security broker (30) has an order processing engine (31) implemented in accordance with the third part of the method as disclosed above. The order processing engine (31) receives order instructions from the order execution engine (22) to process the orders and further finalizes transactions by interacting with the security exchange (40). The security exchange (40) can practically sell/buy electronically traded securities, including stocks, futures, options, bonds, foreign currencies, etc. In addition, the security exchange (40) also can receive and confirm orders from the on-line security broker (30) and can provide security trading quotations in the real time.

With reference to FIGS. 1, 2 and 3, the investor can remotely order a personal virtual manager system by executing the three processing cycles of the ATSC (10) through the electronic commerce engineering service offered by the HPS (13). That is, the investor can access the Personal Investment Strategy Specification Development (121) sector first to negotiate with the ATSC (10) to finalize the specification to code the Decision Making Engine (12). Then, the investor can access the Personal Investment Strategy Coding Development (122) sector to dialogue with the ATSC (10) during the programming cycle based on the specification developed. Once the coding is done, the investor can access the Personal Virtual Fund Manger Simulation (123) sector to test the functionality of the developed program for the eventual approval.

The ATSC (10) further provides management service via the HPS (13) for investors to effectively utilize their VFM systems previously ordered. For daily trading needs, the investor can access the Customer Account Information (130) to acquire the update status of the investor's account, or to access the Personal Virtual Fund Manager Activation (100) to activate the investor's personal Virtual Fund Manager system. One investor can develop any numbers of personal VFM systems as needed to adopt different investment strategies for different securities. During trading hours, the investor can activate all his/her personal VFM systems concurrently. During the activation process, investors are asked to set all the necessary parameters, such as auto/semi-auto trading mode selection, security screening features, and mobile/desktop mode selection.

FIG. 3 is a flow chart of a routine for an investor to interact with the ATSC via the Home Page Service to develop a custom investment strategy based personal Virtual Fund Manager system (210). Since the nature of e-commerce based business is most suitable to serve remote customers with custom specification requirement, the HPS (13) of ATSC (10) is designed to serve this role. The core issue in implementing an automated security trading system is how to instruct the computer to trade securities on investor's behalf. Since the computer is able to execute millions of instructions per second, the present invention allows investors to implement highly sophisticated investment strategies such as adopting self-learning artificial intelligence algorithms with capabilities to concurrently calculate and trace in real time a series of parameters as typically analyzed in technical analysis.

By accessing the Personal Investment Strategy Specification Development (121) sector in Home Page Service (13) provided by the ATSC (10), the investor can initiate the specification development cycle to negotiate with the ATSC (10) for finalizing a mutually acceptable specification. The Investor can set investment strategy specification at the inventor's discretion (211). If questions remain (212), the investor can work with the ATSC (10) to modify the investment strategy algorithms (213) until all problems clarified. The ATSC (10) then launches the coding development cycle to program the investor's custom decision making engine (12) of the VFM-2 in accordance with the specification (214), as provided by the investor via the HPS (13). When the coding is done, the simulation testing cycle begins. The investor runs the simulator provided by the HPS (13) to assess the functionality of the coding results (215). If questions remain (216), the investor works with ATSC (10) to modify the coding (217) until all problems clarified. The announced custom developed Decision Making Engine (218) is then integrated with other parts of the personal Virtual Fund Manager system to fulfill investor's custom specification ordered via the electronic commerce Automated Trading Service Center.

Figure 4:
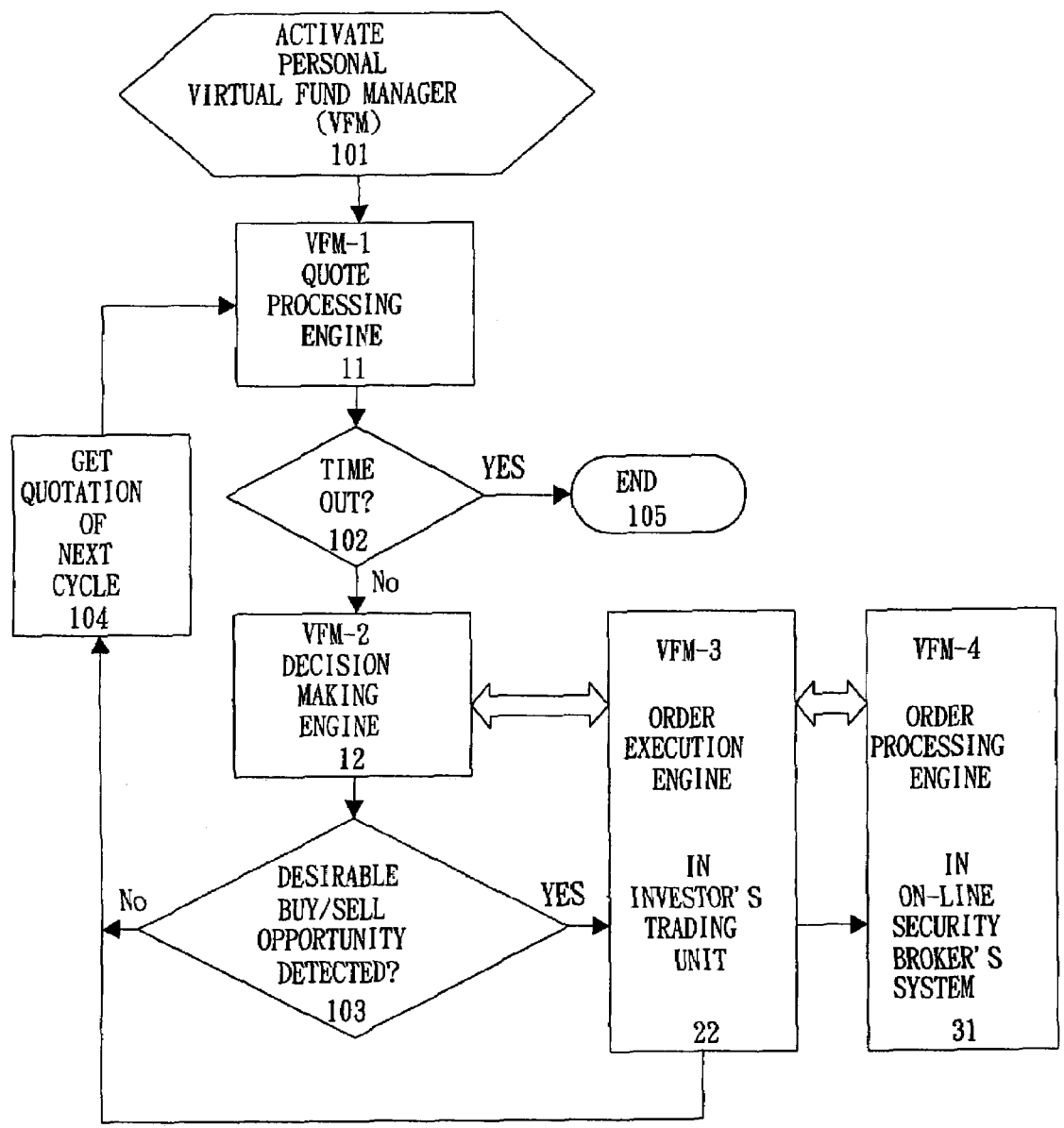
FIG. 4 is a flow chart of the personal Virtual Fund Manager system integrated by four engines running in real time at three separate systems located at different locations.

With reference to FIG. 4, the Virtual Fund Manager (VFM) system (VFM-1, VFM-2, VFM-3, VFM-4) is integrated by four major engines; the quote processing engine (11), the decision making engine (12), the order execution engine (22) and the order processing engine (31) communicate with each other to provide a full-auto trading mode and a semi-auto trading mode.

The investor can access ATSC (10) to activate the investor's personal VFM system via the wireless Internet. When activated (101), the VFM-1 to VFM-4 are sequentially executed real time computer program for automated security trading running periodically at a time interval parameter assigned by investors, for example 0.1 seconds per period. Both the quote processing engine (11) and the decision making engine (12) are located at the server of the ATSC (10) to perform the full-auto trading mode. The quote processing engine (11) can periodically retrieve and process quote information for a particular security of interest from the security exchange (40). The VFM system checks if the market is closed (102) before proceeding to the decision making engine (12), which can monitor market fluctuation to make investment decisions by adopting the investor's predetermined investment strategy algorithms with intensive calculation, if necessary. When desirable Buy/Sell timing is identified (103), the decision making engine (12) immediately interacts with the order execution engine (22) located at the investor's trading unit (20). The order execution engine (22) then automatically interacts with the order processing engine (31) located at the on-line security broker (30) to immediately execute the order if the VFM system is set to full auto trading mode, or simply automatically receive a notice from the decision making engine (12) identifying the investment opportunity when the VFM system is set to semi-auto trading mode pursuing automatic monitoring and notification only. The VFM system retrieves a quotation from the next cycle immediately a Buy/Sell cycle is done (104). The VFM system ends subsequent operations when time is out (105).

Figure 5:
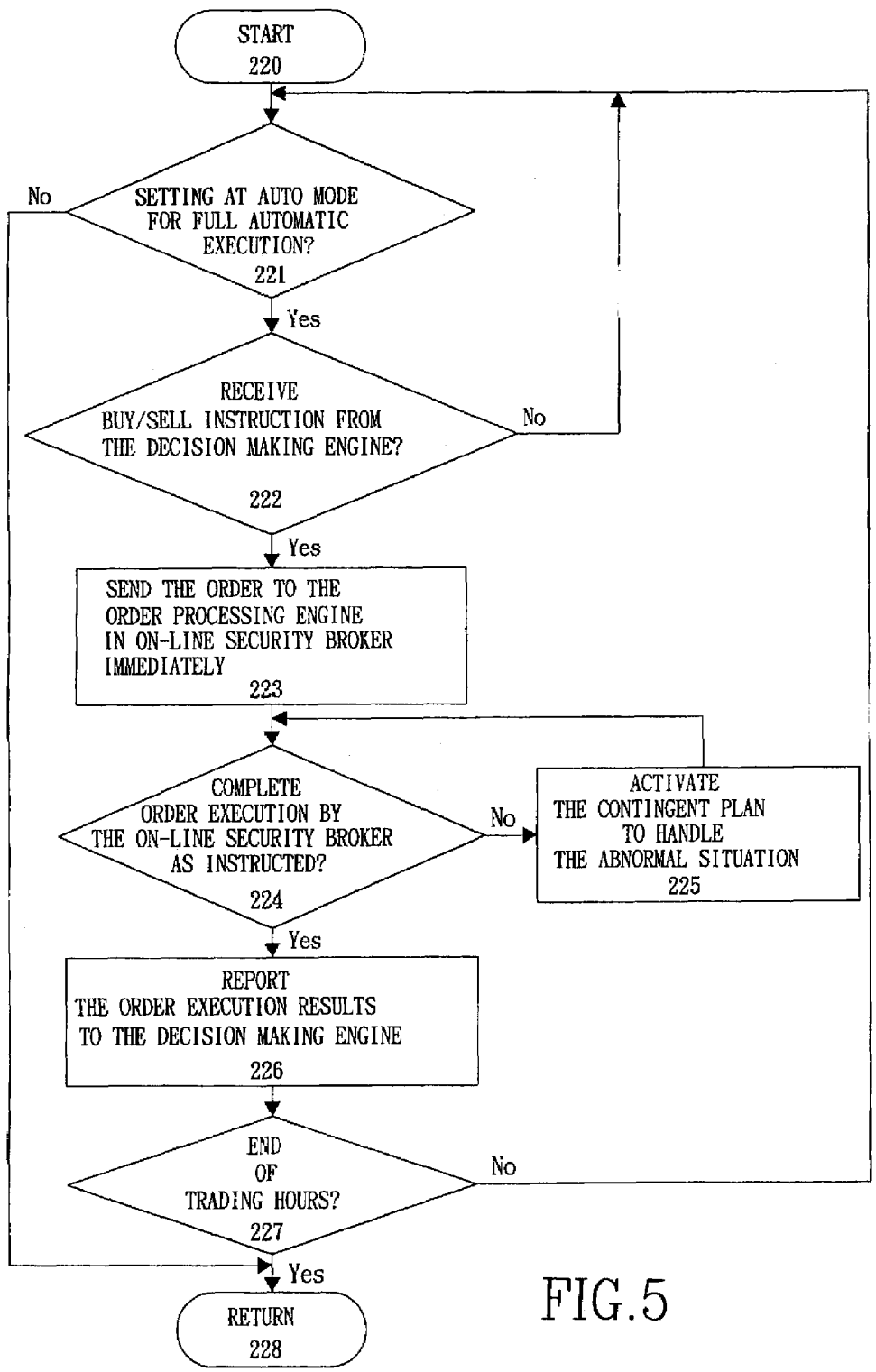
FIG. 5 is a flow chart of an Order Execution Engine of Virtual Fund Manager running in the Investor's Trading Unit.

With reference to FIG. 5, the order execution engine (22) provides operating modes of either an automatic monitoring function or a full automatic execution function. Through the order execution engine (22) at the Investors' Trading Unit (20), the investor has the option to select either the automatic monitoring/-notification only, which is also known as the semi-auto trading mode, or automatic execution that is also known as the full-auto trading mode. Since the investor's trading unit (20) can be switched between a desktop and a mobile platform, overall, the investor can enjoy the benefit of highly secure semi/full automated trading service anytime, anywhere via the wireless Internet communications network. When the market is open, the VFM system is activated (220). The VFM system ignores any order instruction until the system is set at full automatic execution mode (221). The VFM system waits for a Buy/Sell instruction from the decision making engine (222). When an instruction is received, the order execution engine (22) immediately sends the order to the order processing engine (31) located at the on-line security broker (30) (223). Then, the system checks if the order has been filled by the on-line security broker (30) as instructed (224). If not, a contingent plan is activated to handle the abnormal situation (225). When the order execution is confirmed, the VFM system reports the order execution results to the decision making engine (226). The VFM system then checks if the trading time is due (227). If not, the system waits for next transaction cycle. If yes, it ends today's operation (228).

Figure 6:
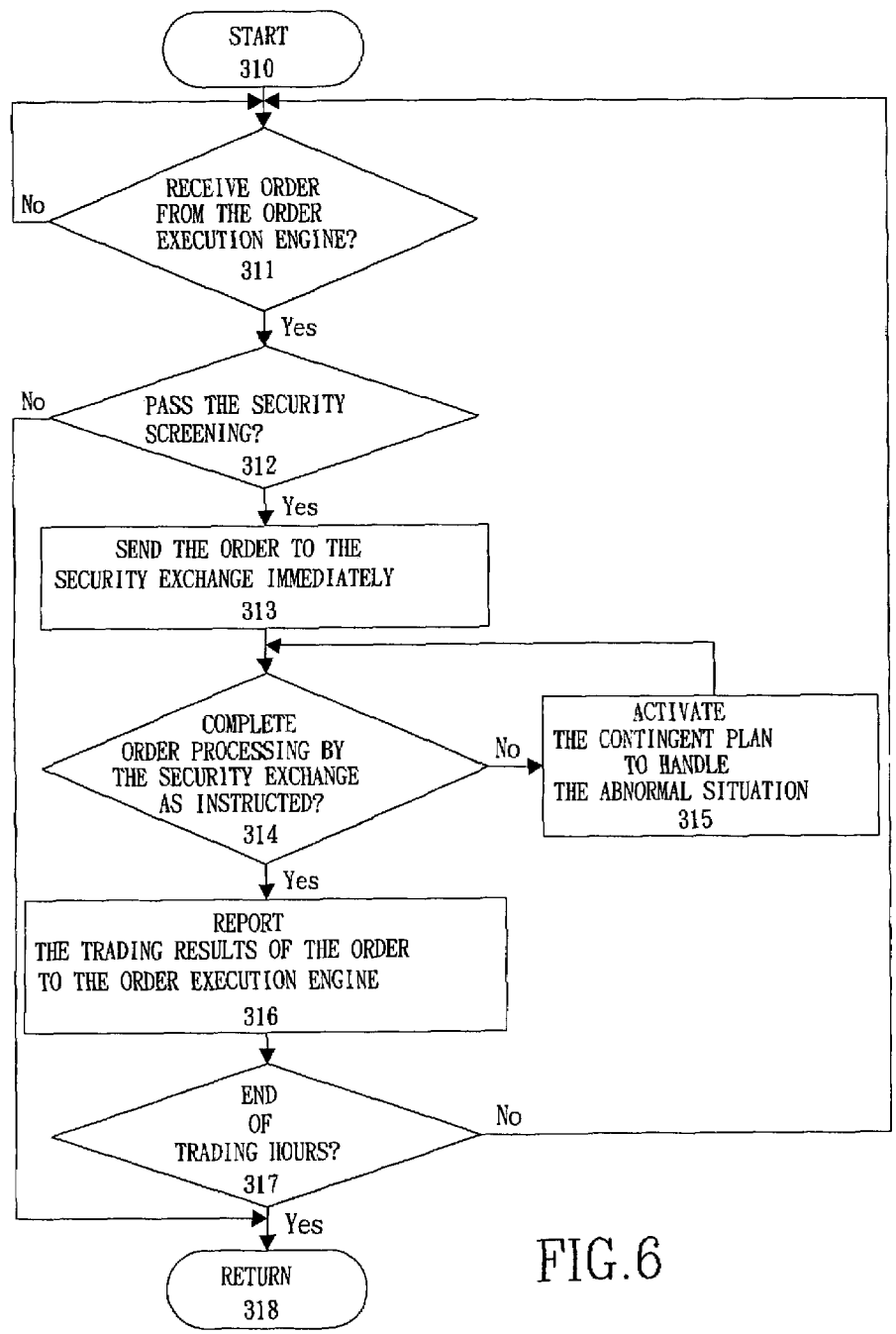
FIG. 6 is a flow chart of an Order Processing Engine of Virtual Fund Manager running in On-Line Security Broker's system.

FIG. 6 discloses how the order processing engine (31) of the personal Virtual Fund Manager operated in the on-line security broker (30). Once the market is open, the system is activated (310) and keeps waiting for the Buy/Sell instruction from the order execution engine (311). Once the instruction is received, the VFM system conducts a security screening to assure that the trading pattern matches investor's pre-registered information (312). If the security check is successful, the VFM system sends the order to the security exchange immediately (313). The VFM system then checks if the order is fulfilled by the security exchange as instructed (314). If not, a contingent plan is activated to handle the abnormal situation (315). Once the transaction of this order is confirmed, the VFM system reports the trading results to the order execution engine (316). The VFM system then checks if the trading time is due (317). If not, the VFM system has to wait for next cycle of transaction. If yes, the VFM system ends today's operation (318).

Based on the forgoing description, the present invention provides many easier usages for trading securities in Internet or Wireless Internet anytime anywhere. The innovative smart personal VFM system not only automatically monitors and notifies the sell/buy timing to the investor, but also, upon request of the investor, automatically sells or buys orders. Therefore, the investor can substantially enhance the profitability by the present invention while reduce trading time and effort. The day traders can even intensively day trade huge amount of securities to capture profit in real time that is unachievable by manual operations. By adopting the present invention, the risk of trading securities can be timely minimized when the market trend turns against the prediction. Thus, the present invention is also regarded as an effective tool for investors to conduct risk management for security trading.

Even though numerous characteristics and advantages of the present invention have been set forth in the foregoing description, together with details of the structure and function of the invention, the disclosure is illustrative only, and changes may be made in detail, especially in matters of sequence, parameter, and algorithm of system modules within the principles of the invention to the full extent indicated by the broad general meaning of the terms in which the appended claims are expressed.

What is claimed is:

1. A method of real time intelligent automated security trading via a wireless Internet, including but not limited to stock trading, futures trading, options trading, bonds trading and foreign currencies trading, comprising steps of:

providing an Automated Trading Service Center (ATSC) implemented by a web server offering a Home Page Service (HPS) and built a quote processing engine linking to at least one security exchange, an investor's trading unit implemented by a desktop or mobile computing platform and built an order execution engine, and an on-line security broker built an order processing engine, wherein the ATSC, the investor's trading unit, the on-line security broker and at least one security exchange communicate with each other via the wireless Internet;

a first part of the method under control of the Automated Trading Service Center (ATSC) having steps of:

engineering at least one decision making engine for each new investor by the HPS, wherein the decision making engine links to the quote processing engine and the engineering step has steps of:

providing a specification development cycle, wherein an investor accesses the HPS via the wireless Internet to set the investor's investment strategy specification at the investor's own discretion;

providing a coding development cycle for coding the investor's investment strategy specification generated to form a decision making engine, which executes the investor's proprietary investment strategy;

providing a simulation testing cycle for simulating algorithms of the investor's investment strategy by integrating the developed decision making engine and the quote processing engine;

managing daily account activities for each active trader;

promoting automated trading services to prospective customers; and under control of the ATSC executing at least one custom developed automated security trading system having steps of:

retrieving market information from the at least one security exchange by the quote processing engine periodically, wherein the market information at least has fluctuation quotation and market open/close trading time in real time;

monitoring the market open/close trading times;

making investment decisions by periodically analyzing and calculating the market information to automatically determine each investor's desirable buy/sell timing in accordance with each investor's own investment strategy algorithms implemented in the corresponding decision making engine; and notifying the investor's trading unit of an investment instruction whenever timing of placing an order is detected based on the investment decisions;

a second part of the method under control of the investor's trading unit having a home page service access interface and an order execution engine and performing subsequent functions of the order execution engine having steps of:

receiving investment instructions from the ATSC;

executing an order placing process, wherein an order is automatically sent; and setting an operation mode to an auto trading mode, which is operated in the order execution engine and comprising steps of:
receiving notification to place orders from the decision making engine;
sending orders automatically to the order processing engine located at the on-line security broker; and
judging whether the market trading time is due to end today's operation when time is out, wherein if a judging result is positive the auto trading mode is ended, but if not, go back to the receiving notification step; and
a third part of the method under the control of the on-line security broker performing subsequent functions of the order processing engine having steps of:
receiving the orders from the second part in the investor's trading unit; and
finalizing transactions with the at least one security exchange, wherein the on-line security broker completes the transaction by executing the order placing process of the investor's trading unit.

2. The method as claimed in claim 1, wherein the HPS provides various electronic commerce services comprising:
a first portion of the electronic commerce services provided to an engineering service and having a personal investment strategy specification development, a personal investment strategy coding development and a personal virtual fund manager simulation;
a second portion of the electronic commerce services providing daily account activities management and having customer account information and personal virtual fund manager activation; and
a third portion of the electronic commerce services provided to the step of promoting automated trading services and has Financial Information, Technical Analysis service, Trend Forecast, Training Simulator and Day Trade Education.

3. The method as claimed in claim 1, wherein
the order processing engine of the on-line security broker further comprises a step of sending notification of completing the transactions after the step of finalizing transactions; and
the auto trading mode of the investor's trading unit further comprises
a step of receiving the notification from the on-line security broker to confirm whether the transactions are completed after step of sending the orders automatically to the order processing engine.

4. The method as claimed in claim 3, wherein features of the order execution engine is implemented as part of the investor's investment strategy algorithm in the custom built decision making engine to enable the ATSC to automatically send orders to the order processing engine located at the on-line security broker.

* * * * *